US011693987B2

(12) United States Patent
Sun et al.

(10) Patent No.: US 11,693,987 B2
(45) Date of Patent: Jul. 4, 2023

(54) DATABASE SECURITY

(71) Applicant: INTERNATIONAL BUSINESS MACHINES CORPORATION, Armonk, NY (US)

(72) Inventors: Sheng Yan Sun, Beijing (CN); Shuo Li, Beijing (CN); Xiaobo Wang, Beijing (CN); Li Cao, Beijing (CN); Hong Mei Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 17/245,233

(22) Filed: Apr. 30, 2021

(65) Prior Publication Data
US 2022/0350916 A1    Nov. 3, 2022

(51) Int. Cl.
*G06F 21/62* (2013.01)
*G06F 21/60* (2013.01)
*G06F 21/78* (2013.01)

(52) U.S. Cl.
CPC ........ *G06F 21/6227* (2013.01); *G06F 21/604* (2013.01); *G06F 21/78* (2013.01)

(58) Field of Classification Search
CPC .... G06F 21/604; G06F 21/62; G06F 21/6218; G06F 21/6227; G06F 21/6245; G06F 21/78; G06F 2221/2141; H04L 63/10–105; H04L 63/20
See application file for complete search history.

(56) References Cited

U.S. PATENT DOCUMENTS 6,820,082 B1    11/2004  Cook et al.
7,299,504 B1    11/2007  Tiller et al.
2015/0347773 A1 12/2015  Bonney et al.
(Continued)

FOREIGN PATENT DOCUMENTS

CN    110351219    10/2019
WO    2015005765    1/2015

OTHER PUBLICATIONS

International Search Report and Written Opinion of the International Searching Authority dated Jun. 9, 2022 in PCT Application No. PCT/CN2022/080350, 9 pages.
(Continued)

*Primary Examiner* — Kevin Bechtel
(74) *Attorney, Agent, or Firm* — David Mattheis; Andrew D. Wright; Calderon Safran & Cole P.C.

(57) ABSTRACT

A method includes: obtaining, by a database server, security policies associated with a database hosted by the database server; obtaining, by the database server, first database data associated with the database; creating, by the database server, a knowledge distillation model using the security policies and the first database data; obtaining, by the database server, second database data associated with the database; creating, by the database server, a classification model using the second database data and an output of the knowledge distillation model; receiving, by the database server, a client database request to the database; determining, by the database server, a new security policy rule set using the classification model; and applying, by the database server, the new security policy rule set to the client database request.

20 Claims, 12 Drawing Sheets

(56) References Cited

U.S. PATENT DOCUMENTS

| | | |
|---|---|---|
| 2019/0311149 A1 | 10/2019 | Margel et al. |
| 2020/0186569 A1 | 6/2020 | Milazzo et al. |
| 2020/0401929 A1 | 12/2020 | Duerig et al. |
| 2021/0350254 A1* | 11/2021 | Furlanetto ............... G06N 3/063 |
| 2022/0094715 A1* | 3/2022 | Eedarapalli ............. H04L 63/10 |
| 2022/0101184 A1* | 3/2022 | Asif ....................... G06N 20/00 |

OTHER PUBLICATIONS

Kamra et al., "Survey of Machine Learning Methods for Database Security", Mar. 2009, 19 pages.

Mattsson, "Database Encryption—How to Balance Security with Performance", Feb. 2005, 16 pages.

Linster, "Creating a multi-layered security architecture for your databases", Oct. 22, 2019, 5 pages.

Mann et al., "The special case of data protection and self-adaptation", May 2018, 2 pages.

Juliet, "Security Model for Federated Database Systems", Apr. 2016, 4 pages.

Mell et al., "The NIST Definition of Cloud Computing", NIST, Special Publication 800-145, Sep. 2011, 7 pages.

\* cited by examiner

600

| Business | Token | Application authorization | Application method | Protocol | Database type |
|---|---|---|---|---|---|
| User/role | Time | Connectivity IP | User authorization | Role authorization | Connectivity method |
| Activities | DDL | DML | DCL | Maintenance method | Database object / field / verb |
| Database and network structure | Database catalog | Network connectivity | Local or remote | Cluster size | Traffic within nodes |

FIG. 6

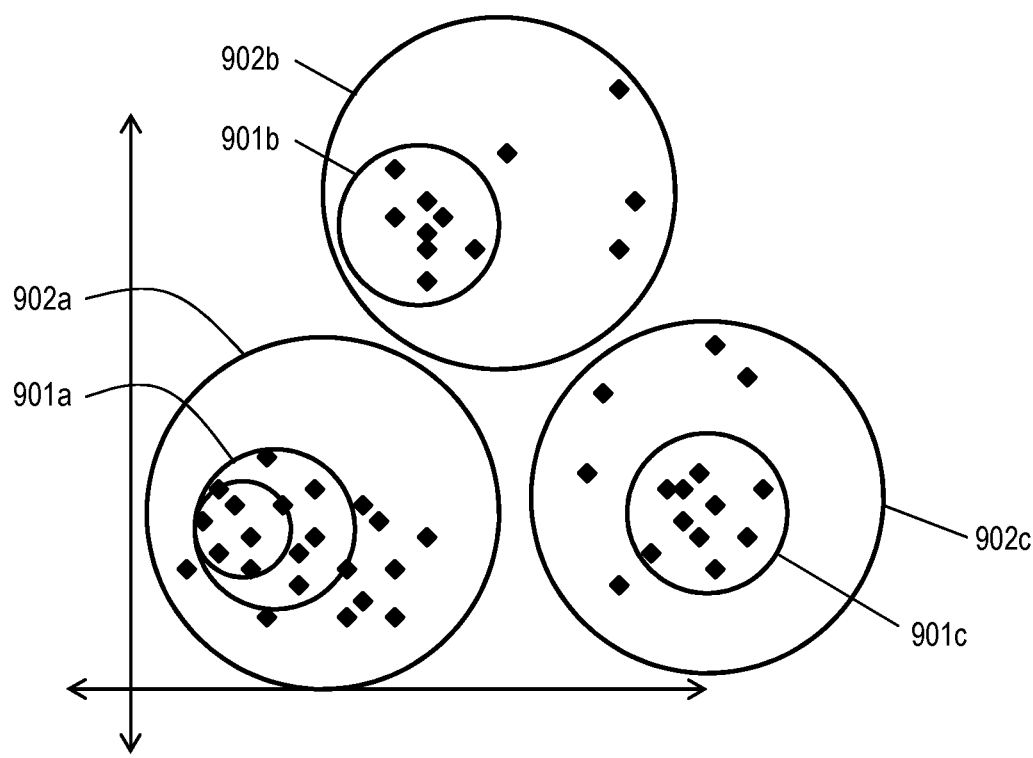

1100

| Table Cardinality | Page number | Access frequency | Index level | Policy sets |
|---|---|---|---|---|
| 100 ~ 10000 | 5 ~ 15 | 20 ~ 100 | P1 | (N1, N2, N3, ...) |
| 10000 ~ 1000000 | 15 ~ 30 | 100 ~ 1500 | P2 | (M1, N2, N3, ...) |
| 1000000 | 30 | 1500 | P3 | ... |

1105

| Policy type | Session queue | Action level | Query queue | Complexity of statements |
|---|---|---|---|---|
| Log all sessions | 100-200 | (A1, A2, ...) | 150w-180w | short |
| Log all sessions | 15 ~ 30 | ... | 1w ~ 1.5w | long |
| Specific object | 100-200 | ... | 10w-20w | long |

FIG. 11

DATABASE SECURITY

BACKGROUND

Aspects of the present invention relate generally to database security and, more particularly, to using machine learning to achieve a balance between database security and database performance.

A database refers to a set of related data that is organized into a data collection. Typically, a database includes schemas, tables, queries, reports, views, and other objects. Databases are used to support internal operations of organizations and to underpin online interactions with customers, for example. Databases also are used to hold administrative information and more specialized data, such as engineering data or economic models.

Access to the collection of data stored in a database is usually provided by a database management system (DBMS) consisting of computer software that allows users to interact with the database and provides access to the data contained in the database. However, restrictions may exist that limit access to particular data. Generally, a database management system is designed to allow the definition, creation, querying, updating, and administration of a database. Because of the relationship between the database and the database management system, the term database often refers to both the database and its corresponding database management system. Both the database and its corresponding database management system conform to the principles of a particular database model. A database system collectively refers to the database model, the database management system, and the database. A physical database server is a dedicated computer that stores the database and runs the corresponding database management system.

Finding an optimum balance between database security and database performance is a long-standing challenge in the field of database security. On the one hand, database customers desire to follow laws, regulations, and audit requirements for the purpose of minimizing risk. On the other hand, implementing database security systems is costly in terms of computing resources. Achieving a high level of security in a database typically involves a high cost in computing resources. The high cost of computing resources typically reduces the performance of the database and, thus, poses a technological problem in the field of database security.

SUMMARY

In a first aspect of the invention, there is a computer-implemented method. The method includes obtaining, by a database server, security policies associated with a database hosted by the database server. The method includes obtaining, by the database server, first database data associated with the database. The method includes creating, by the database server, a knowledge distillation model using the security policies and the first database data. The method includes obtaining, by the database server, second database data associated with the database. The method includes creating, by the database server, a classification model using the second database data and an output of the knowledge distillation model. The method includes receiving, by the database server, a client database request to the database. The method includes determining, by the database server, a new security policy rule set using the classification model. The method includes applying, by the database server, the new security policy rule set to the client database request. Advantageously, such a method is useful for determining database security rule sets that satisfy the applicable security policies and rules while minimizing a cost of computing resources.

In embodiments, creating the knowledge distillation model includes: determining affected factors from the security policies; and analyzing groupings of the affected factors. In this manner, embodiments advantageously determine how different group size affects security performance.

In another aspect of the invention, there is a computer program product including one or more computer readable storage media having program instructions collectively stored on the one or more computer readable storage media. The program instructions are executable to obtain security policies associated with a database hosted by a database server. The program instructions are executable to obtain first database data associated with the database. The program instructions are executable to create a knowledge distillation model using the security policies and the first database data. The program instructions are executable to obtain second database data associated with the database. The program instructions are executable to create a classification model using the second database data and an output of the knowledge distillation model. The program instructions are executable to receive a client database request to the database. The program instructions are executable to determine a new security policy rule set using the classification model. The program instructions are executable to apply the new security policy rule set to the client database request. Advantageously, such a computer program product is useful for determining database security rule sets that satisfy the applicable security policies and rules while minimizing a cost of computing resources.

In embodiments, creating the knowledge distillation model includes: determining affected factors from the security policies; and analyzing groupings of the affected factors. In this manner, embodiments advantageously determine how different group size affects security performance.

In another aspect of the invention, there is system including a processor, a computer readable memory, one or more computer readable storage media, and program instructions collectively stored on the one or more computer readable storage media. The program instructions are executable to obtain security policies associated with a database hosted by a database server. The program instructions are executable to obtain first database data associated with the database. The program instructions are executable to create a knowledge distillation model using the security policies and the first database data. The program instructions are executable to obtain second database data associated with the database. The program instructions are executable to create a classification model using the second database data and an output of the knowledge distillation model. The program instructions are executable to receive a client database request to the database. The program instructions are executable to determine a new security policy rule set using the classification model. The program instructions are executable to apply the new security policy rule set to the client database request. Advantageously, such a system is useful for determining database security rule sets that satisfy the applicable security policies and rules while minimizing a cost of computing resources.

In embodiments, creating the knowledge distillation model includes: determining affected factors from the security policies; and analyzing groupings of the affected factors.

In this manner, embodiments advantageously determine how different group size affects security performance.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 6 shows an exemplary parameter set used in creating the knowledge distillation model in accordance with aspects of the invention.

FIG. 9 shows exemplary groupings of affected factors in accordance with aspects of the invention.

FIG. 10 shows exemplary algorithms used in machine learning in accordance with aspects of the invention.

FIG. 11 shows examples of classification parameters used in accordance with aspects of the invention.

DETAILED DESCRIPTION

Figure 1:
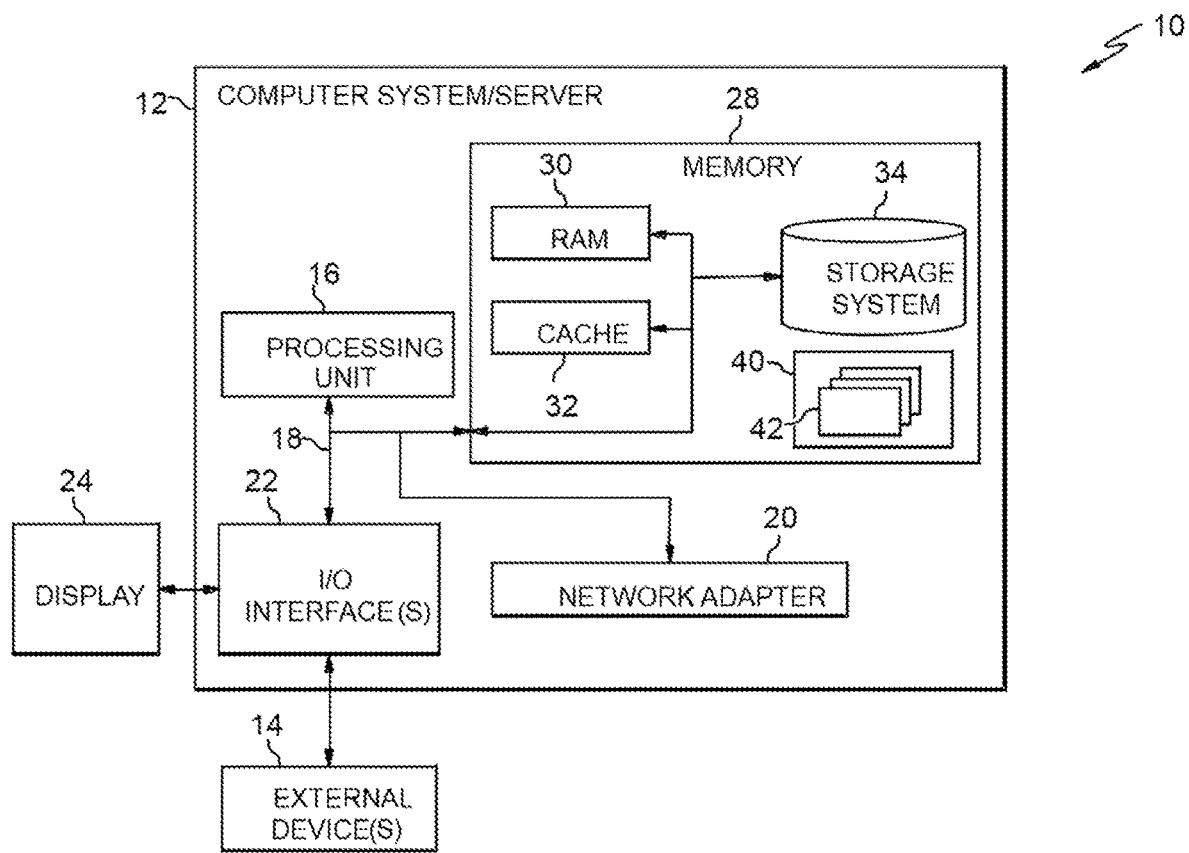
FIG. 1 depicts a cloud computing node according to an embodiment of the present invention.

Databases are organized collections of data that are stored and accessed by users operating client devices. With the increased use of cloud computing, databases are increasingly located in the cloud. By moving or placing databases in the cloud, access can occur from any location where a connection to the Internet is present.

Larger and larger amounts of data are being collected, processed, and distributed using cloud databases. The data can include confidential information and the data may also have high compliance requirements. With cloud database services, the increased access and availability is present over the Internet. This increased access and availability also increases exposure to potential unauthorized access to these types of databases. Currently, security policies are utilized to protect the databases from unauthorized access to sensitive information in the databases. These security policies cut connections when actions are performed that indicate an attempt at unauthorized access to the database.

Finding an optimum balance between database security policies and database performance is a long-standing challenge in the field of database security. Achieving a high level of security in a database typically involves a high cost in computing resources. The high cost of computing resources typically reduces the performance of the database and, thus, poses a technological problem in the field of database security. Implementations of the invention address this technological problem with the technological solution of using machine learning to determine database security rule sets that satisfy the applicable security policies and rules while minimizing a cost of computing resources. Embodiments utilize a knowledge distillation model to determine an optimum level at which to apply security policies and rules, and further use a classification model to determine an optimum security policy and rule combination for a particular client database request. In this manner, implementations of the invention utilize machine learning to achieve a balance between database security and database performance.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
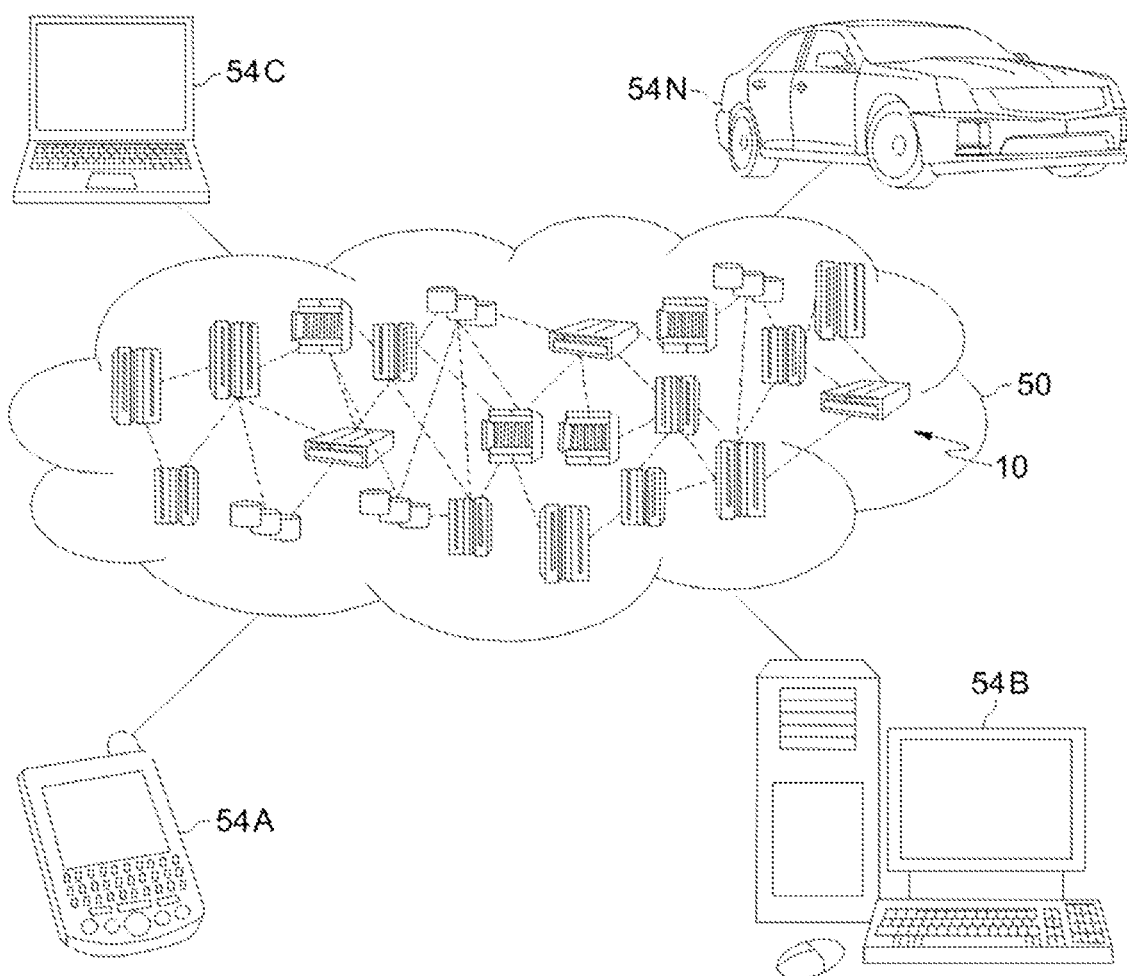
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
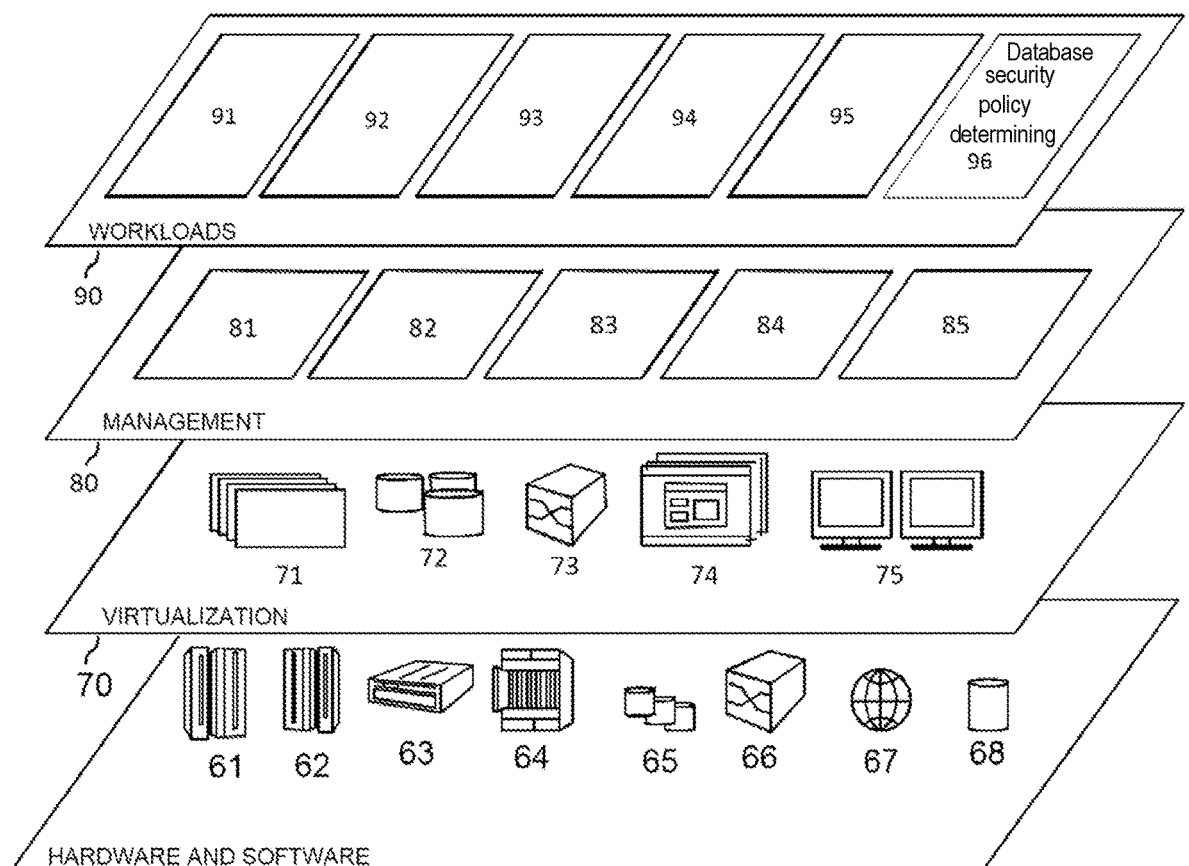
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database security policy determining 96.

Implementations of the invention may include a computer system/server 12 of FIG. 1 in which one or more of the program modules 42 are configured to perform (or cause the computer system/server 12 to perform) one or more functions of the database security policy determining 96 of FIG. 3. For example, the one or more of the program modules 42 may be configured to: obtain security policies associated with a database hosted by a database server; obtain first database data associated with the database; create a knowledge distillation model using the security policies and the first database data; obtain second database data associated with the database; create a classification model using the second database data and an output of the knowledge distillation model; receive a client database request to the database; determine a new security policy rule set using the classification model; and apply the new security policy rule set to the client database request. This use of using machine learning to determine database security rule sets that satisfy the applicable security policies and rules while minimizing a cost of computing resources provides an improvement in the art.

Figure 4:
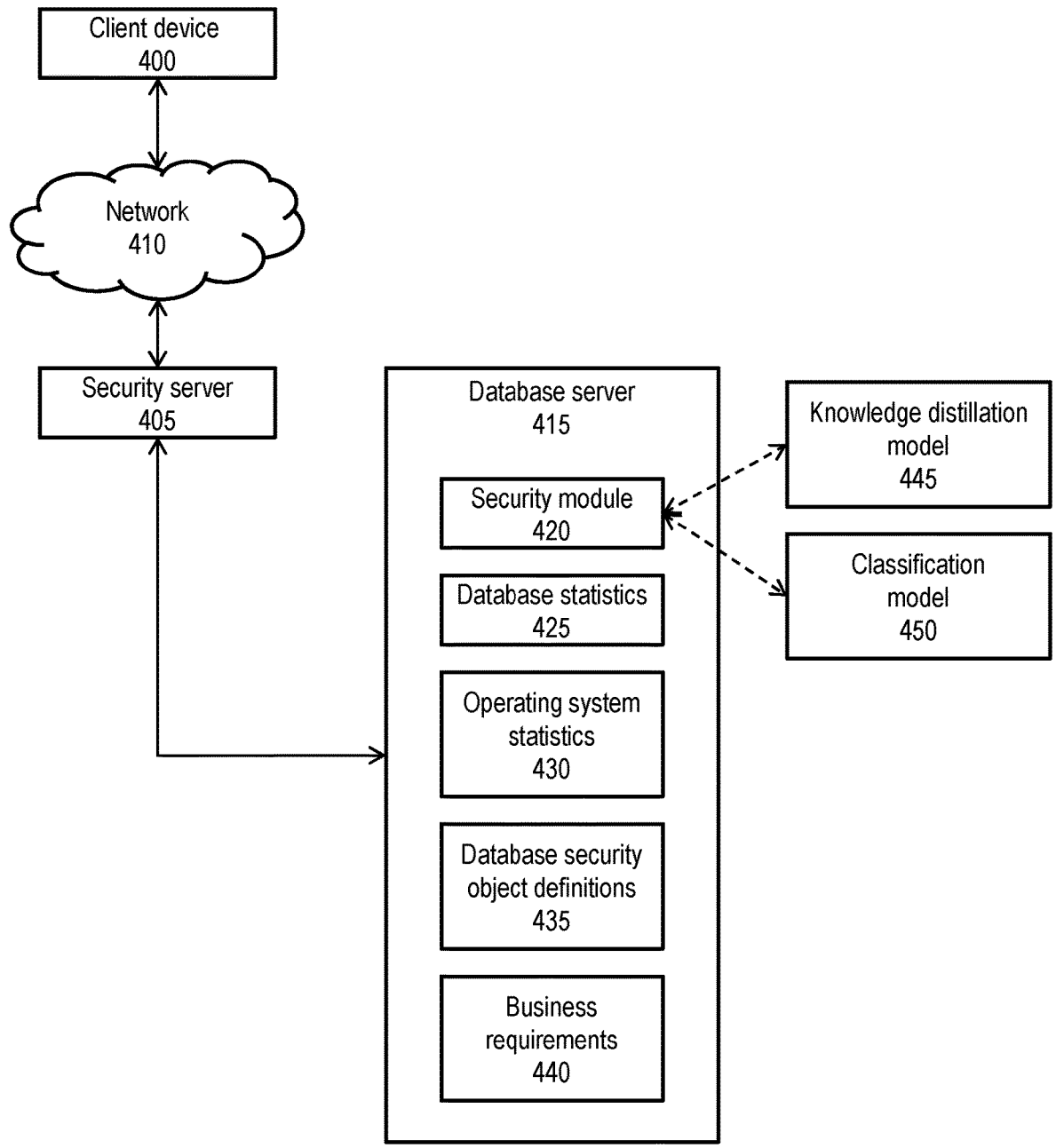
FIG. 4 shows a block diagram of an exemplary environment in accordance with aspects of the invention.

FIG. 4 shows a block diagram of an exemplary environment in accordance with aspects of the invention. In embodiments, the environment includes a client device 400 and a security server 405 connected via a network 410. The client device 400 comprises a computing device including one or more elements of computer system/server 12, and may include a desktop computer, laptop computer, tablet computer, or smartphone, for example. In one example a database client utilizes the client device 400 to access a database that is managed by a database server 415. The network 410 includes one or more communications networks such as one or more of a LAN, WAN, and the Internet. The security server 405 and the database server 415 each comprise one or more servers including one or more elements of computer system/server 12. In a cloud implementation, the network 410 comprises the cloud computing environment 50 of FIG. 2, the client device 400 comprises one of computing devices 54A-N shown in FIG. 2, and the security server 405 and the database server 415 each comprise one or more cloud computing nodes 10 of FIG. 2.

In embodiments, the database server 415 comprises a security module 420, which may comprise one or more program modules such as program modules 42 described with respect to FIG. 1. The database server 415 may include additional or fewer modules than those shown in FIG. 4. For example, the database server 415 may comprise additional modules that are programmed to function as one or both of a database application and a database management system as those terms are understood by one of skill in the art. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In accordance with aspects of the invention, the security module 420 is programmed to utilize database statistics 425, operating system statistics 430, and database security object definitions 435 to create a knowledge distillation model 445. In embodiments, the security module 420 obtains database security policies and rules from plural traditional database security systems. The policies and rules contain numerous parameters that can be utilized with relatively large machine learning models to build suites of new security policies. In embodiments, for particular database statistics 425, operating system statistics 430, and database security object definitions 435, the security module 420 utilizes machine learning algorithms and knowledge distillation techniques to create a relatively small machine learning model (the knowledge distillation model 445) that determines relevant database security requirement definitions generated from a limited number of initial inputs. In this manner, the security module 420 is configured to determine a new multiple level security policy-rule for this database, where multiple level means there are different sets of policies and rules for different levels of this database (e.g., the database application level, the runtime level, the storage level, etc.).

In accordance with aspects of the invention, the security module 420 is programmed to utilize an output of the knowledge distillation model 445, operating system statistics 430, and business requirements 440 to create a classification model 450. In embodiments, the security module 420 uses machine learning algorithms to train a machine learning model (the classification model 450) using the output of the knowledge distillation model 445, operating system statistics 430, and business requirements 440. The trained classification model 450 receives a particular set of operating system statistics 430 and business requirements 440 as input and outputs a new policy rule set. In this manner, the security module 420 determines a new policy rule set to apply to a database request made by the client device 400.

Figure 5:
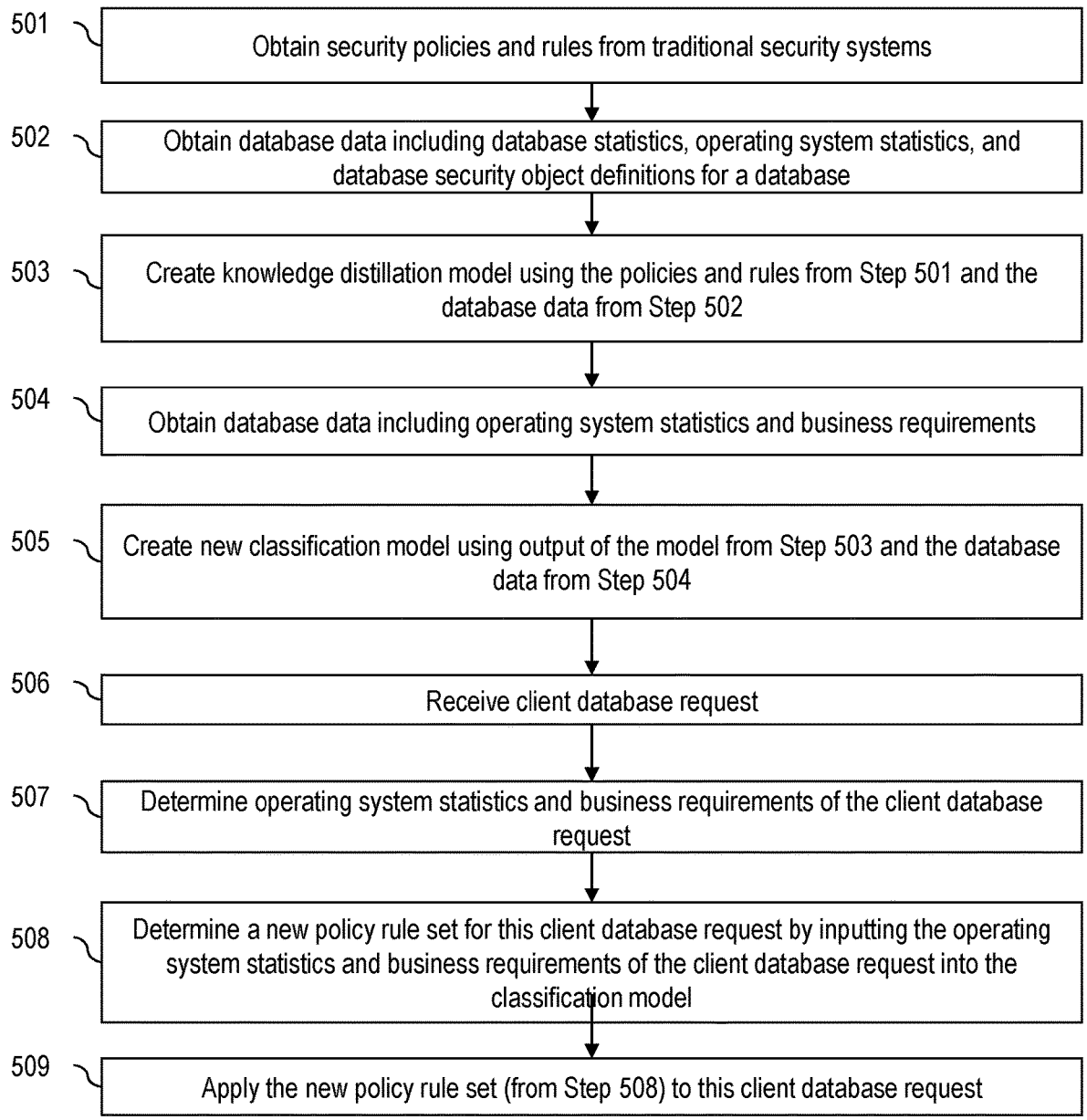
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 501, the system obtains database security policies and rules from traditional database security systems. In embodiments, the security module 420 obtains the database security policies and rules from systems such as collectors and databases servers. Non-limiting examples of policies include: sending an alert message (e.g., email) to a data security administrator in response to a particular IP address or application sending a query to the database server; sending an alert message (e.g., email) to a data security administrator in response to a governed user querying the database in a predefined time window; only send a predefined number of rows (e.g., 100 rows) in a result when a governed user attempts to query specific table columns in a database; and terminate a database connection when a user attempts to query a governed table more than a specified number of times. Rules may include exception rules and access rules, for example, some non-limiting examples of which are: exception rule (failed login—log violation); exception rule (failed login—alert if repeated); exception rule (SQL error—log); exception rule (SQL error—alert on risk indicative errors); access rule (selects commands—log full details); access rule (DDL commands—log full details); access rule (suspicious users—log full details); and access rule (admin users—log full details).

At step 502, the system obtains database data including database statistics, operating system statistics, and database security object definitions for a database. In embodiments, the security module 420 determines the database statistics 425, operating system statistics 430, and database security object definitions 435 from data available via the database server 415. In one example, the security module 420 obtains this data from a database management system running on this database server 415. The database statistics 425 are described further at FIG. 7. The database security object definitions 435 are described further at FIG. 8. In one example, the operating system statistics used in this step include one or more of: CPU rate; CPU time; I/O rate; page read/write; and network packages sent/received.

At step 503, the system creates a knowledge distillation model using the policies and rules from step 501 and the database data from step 502. The knowledge distillation model 445 and its creation by the security module 420 is described further at FIGS. 9 and 10.

At step 504, the system obtains database data including operating system statistics 430 and business requirements 440. In embodiments, the security module 420 determines the operating system statistics 430 and the business requirements 440 from data available via the database server 415. In one example, the security module 420 obtains this data from a database management system running on this database server 415. In one example, the operating system statistics 430 used in this step include one or more of: CPU usage; I/O usage; network packages received; query queue; and page wait. In one example, the business requirements 440 used in this step include one or more of: system performance impact cannot exceed a predefined amount; and I/O wait cannot exceed a predefined amount.

At step 505, the system creates a new classification model using the output of the knowledge distillation model (from step 503) and including the operating system statistics 430 and business requirements 440 (from step 504). In embodiments, the security module 420 uses machine learning algorithms to train the classification model 450 using the output of the knowledge distillation model 445, operating system statistics 430, and business requirements 440. In embodiments, the trained classification model 450 is configured to receive a particular set of operating system statistics 430 and business requirements 440 as input, and to output a new policy rule set for this database for the particular set of operating system statistics 430 and business requirements 440.

At step 506, the system receives a client database request. In embodiments, the database server 415 receives a database request from the client device 400, e.g., via a database application or a database management system.

At step 507, the system determines operating system statistics 430 and business requirements 440 associated with the request (from step 506). In embodiments, the business requirements 440 are defined via user input. In embodiments, the operating system statistics 430 are obtained using a software collection tool such as a general system statistics collection tool or a database security tool on the server side.

At step 508, the system determines a new policy rule set for this client database request by inputting the operating system statistics 430 and business requirements 440 of the client database request into the classification model 450. In embodiments, the security module 420 inputs the operating system statistics 430 and business requirements 440 (from step 507) into the classification model 450 (from step 505). The output of the classification model 450 is a policy rule set for this client database request (from step 506). An example of a new policy rule set is shown in FIG. 11.

At step 509, the system applies the new policy rule set to this client database request. In embodiments, a software security tool running on the system (e.g., at security server 405) applies the determined policy rule set (from step 508) to this client database request (from step 506), e.g., via a database application or a database management system.

FIG. 6 shows an exemplary parameter set 600 used in creating the knowledge distillation model 445 in accordance with aspects of the invention. In embodiments, the parameter set 600 includes factors (e.g., affected factors) that are included in the database security policies and rules obtained at step 501 of FIG. 5. In embodiments, the security module 420 determines the parameter set 600 by analyzing the database security policies and rules obtained at step 501 of FIG. 5. In one example, the security module 420 identifies all the factors included in the database security policies and rules, and then uses cosine similarity to determine which factors to deem as affected factors for inclusion in the parameter set 600. In this example, the security module 420 creates vectors that correspond to the database security policies and rules. The security module 420 uses cosine similarity to compare similarity between the different vectors. In embodiments, the security module 420 vectorizes nodes to calculate whole factors, and also utilizes a dynamic threshold. In this manner, the security module 420 determines which factors to include in the parameter set based on comparing the determined cosine similarity to the threshold, with factors having a similarity that exceeds the threshold being included in the parameter set 600. The factors shown in the parameter set 600 in FIG. 6 are examples, and other databases may have different factors in the parameter set.

Figures 7, 8:
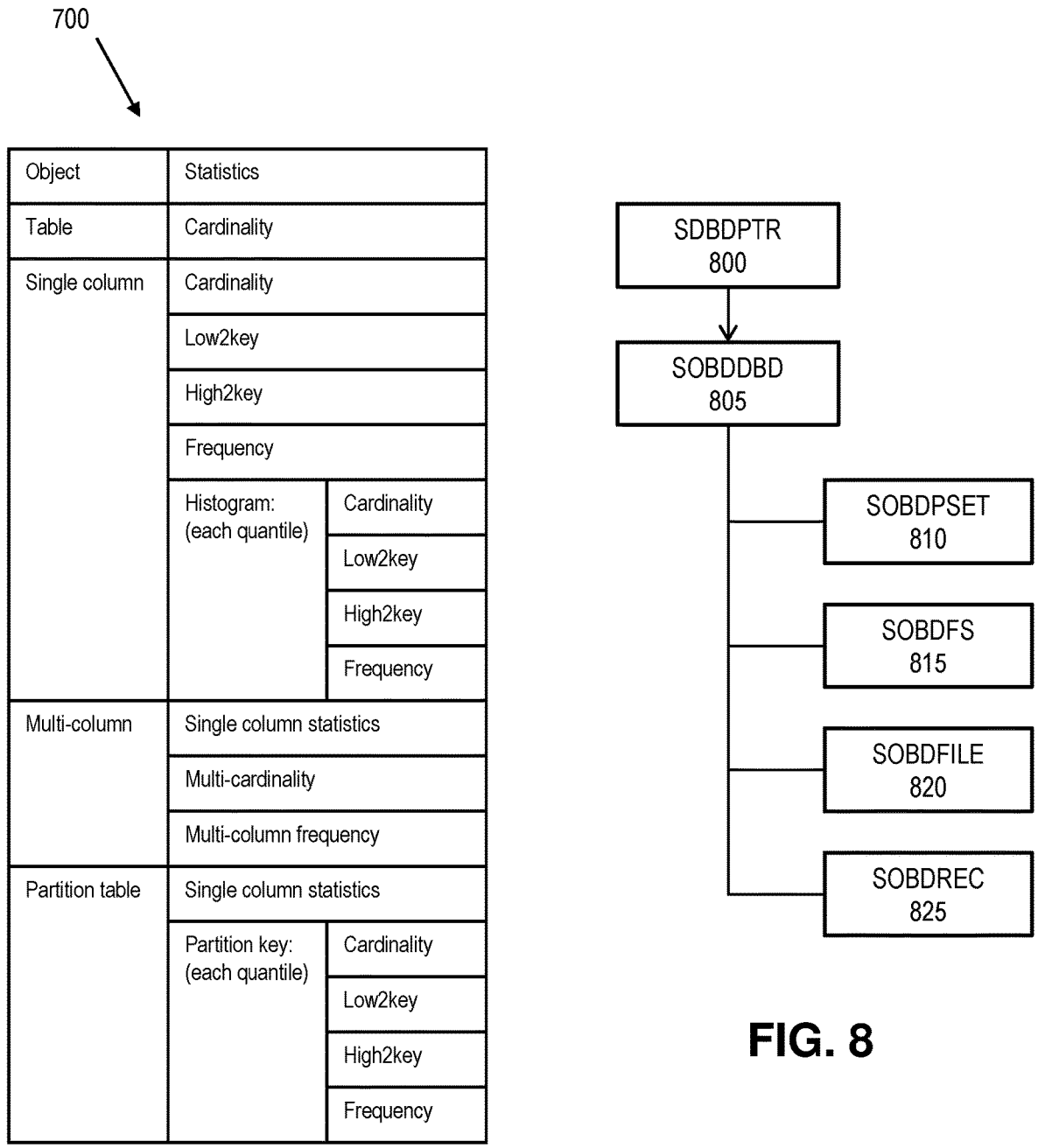
FIG. 7 shows an example set of database statistics in accordance with aspects of the invention.
FIG. 8 shows an example of database security object definitions in accordance with aspects of the invention.

FIG. 7 shows an example set 700 of the database statistics obtained at step 502 of FIG. 5 in accordance with aspects of the invention. The database statistics shown in the set 700 are examples, and other databases may have different statistics. In this example, the set 700 includes database objects including table, single column, multi-column, and partition table. In this example, the set 700 includes statistics (e.g., cardinality, etc.) for each of the database objects. In embodiments, the database server obtains the database statistics using database internal functions or external system tools.

FIG. 8 shows an example of the database security object definitions obtained at step 502 of FIG. 5 in accordance with aspects of the invention. The database security object definitions shown in FIG. 8 are examples, and other databases may have different database security object definitions. In this example, SDBDPTR 800 is a pointer that points to a parent node that manages a database on behalf of a database management system. In this example, SOBDDBD (security object definition, database description) 805 is a security object definition that defines a database as a collection of database objects. In this example, SOBDPSET (security object definition, pageset) 810 is a security object definition that defines a database pageset, which is an instance of a database file. In this example, SOBDFS (security object definition, file system) 815 is a security object definition that defines an access path to data as indexes, hashes, or links. In this example, SOBDFILE (security object definition, file) 820 is a security object definition that defines a tablespace as a collection of tables and/or pagesets. In this example, SOBDREC (security object definition, record) 825 is a security object definition that defines a table and that defines rows within the table. In embodiments, the security object definitions 810, 815, 820, 825 define different levels of security policies and rules that apply to the database associated with the database server 415 (of FIG. 4). In this manner, the system determines two groups of data that are included in the database security policies and rules and that are embedded in different database security object levels. In some embodiments, the database server attaches parameters to the database objects, and the database is configured to implement these parameters.

FIG. 9 shows exemplary groupings of affected factors in accordance with aspects of the invention. In embodiments, at step 503 of FIG. 5, the security module 420 categorizes the affected parameters (from the parameter set 600 of FIG. 6, shown as points in the graph of FIG. 9) into different groups 901a-c and 902a-c. The security module 420 then analyzes the groupings of the affected parameters to determine how different group size affects security performance (i.e., satisfaction of security rules and policies). Based on this analysis and using the database data (e.g., database statistics, operating system statistics, and database security object definitions obtained at step 502 of FIG. 5) the security module 420 creates a machine learning model (e.g., knowledge distillation model 445 of FIG. 4) that receives first groups having a relatively smaller group size (e.g., 901a-c) and that outputs second groups having a relatively larger group size (e.g., 902a-c). In embodiments, the model is created and trained using machine learning algorithms and the training data described herein, such that the model is configured to determine at least one new group size, given a set of input group sizes, that meets the security requirements and also optimizes the computing performance. In embodiments, the system utilizes a cost function based on the operating system statistics to model, and thus, optimize the computing performance. In one example, the model is created and trained to determine an optimum maximum group size that meets the security requirements. In this manner, the model receives, as input, a first set of groups having a relatively smaller group size and generates, as output, a second set of groups having a relatively larger group size, where the second set of groups satisfies the same security requirements as the first set of groups, but does so with a better (e.g., lower cost) computing performance than that of the first set of groups. In embodiments, the group size corresponds to policies and rules for different levels of this database (e.g., the database application level, the runtime level, the storage level). In this manner, by using the model to determine a different group size, the model may be used to determine applying rules at different levels to satisfy the same security policies at a lower computing cost, which provides an improvement in the art.

Still referring to FIG. 9, in embodiments the determining the group sizes comprises preparing a policy-rule and calculating a vector relationship map. In some examples, each policy-rule is flexible for searching a related policy-rule. Accordingly, after the factor data vectorization described above, vector distances can be calculated on included angles of vectors. In embodiments, step 503 of FIG. 5 also includes a policy-rule adding "take action" as a particular group for level definition in order to ensure the group size and effect are both as expected. In embodiments, step 503 of FIG. 5 also includes screening and pruning a particular group for policy level definition. In implementations, these steps are used to create the model which receives, as input, small size groups and the generates, as output, groups having a different size and different level of computing cost to perform compared to that of the smaller size groups. In one exemplary implementation, the security module 420 creates the model using a feed forward network (FFN) to train a neural network according to algorithms 1001 and 1002 shown in FIG. 10.

FIG. 11 shows examples of classification parameters used in accordance with aspects of the invention. FIG. 11 shows a first table 1100 of classification parameters including table cardinality, page number, access frequency, index level, and policy sets. FIG. 11 also shows a second table 1105 of classification parameters including policy type, session queue, action level, query queue, and complexity of statements. The classification parameters shown in FIG. 11 are examples, and other databases may have different classification parameters. In embodiments, the classification parameters shown in FIG. 11 are used in creating and training the classification model at step 505 of FIG. 5. For example, the classification parameters may include some or all of the operating system statistics and business requirements used for training the classification model. In one example, the classification model is trained using logistic regression techniques.

Figure 12:
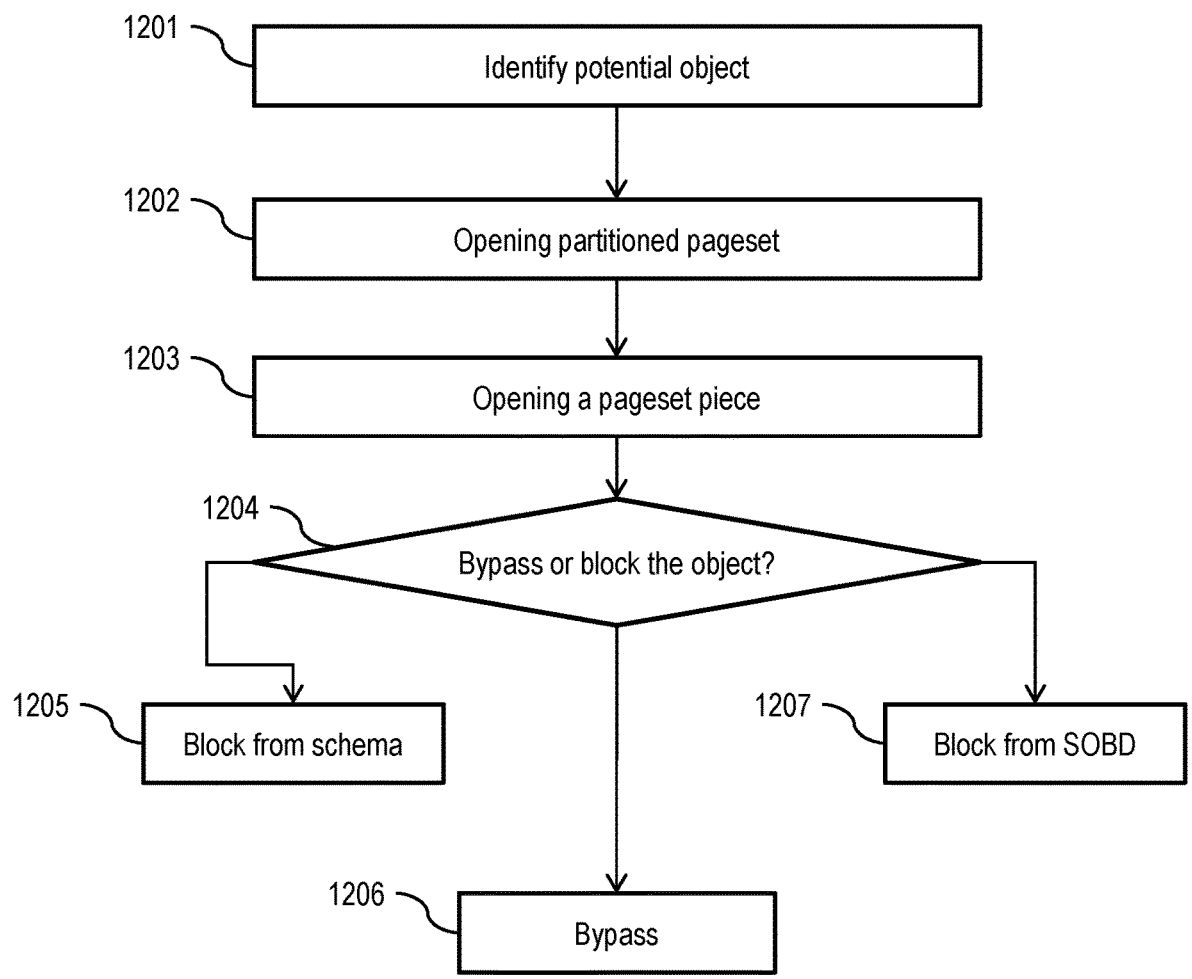
FIG. 12 shows a flowchart of an exemplary method in accordance with aspects of the invention.

FIG. 12 shows a flowchart of an exemplary method in accordance with aspects of the present invention. Steps of the method may be carried out in the environment of FIG. 4 and are described with reference to elements depicted in FIG. 4. The method of FIG. 12 is an example of a use case with a partition action. In embodiments, the database server 415 identifies a potential object at step 1201 (e.g., by using the security policy or rule to determine which object (table, column, or partition) is involved in the security check), opens the partitioned pageset at step 1202 and opens a pageset piece at step 1203 (e.g., using database operational tasks to open the related object partitioned pageset and pageset piece), and checks whether to bypass or block the object at step 1204 (e.g., based on comparing the policy to the determined object). Based on the check at step 1204, the database server 415 performs one of: blocks the partition at step 1205 (e.g., blocks the query from the schema level for a high level violation), bypasses the security rule at step 1206 (e.g., when not a violation), or blocks the result from the SOBD at step 1207 (e.g., blocks the query only for the specific partition).

Figure 13:
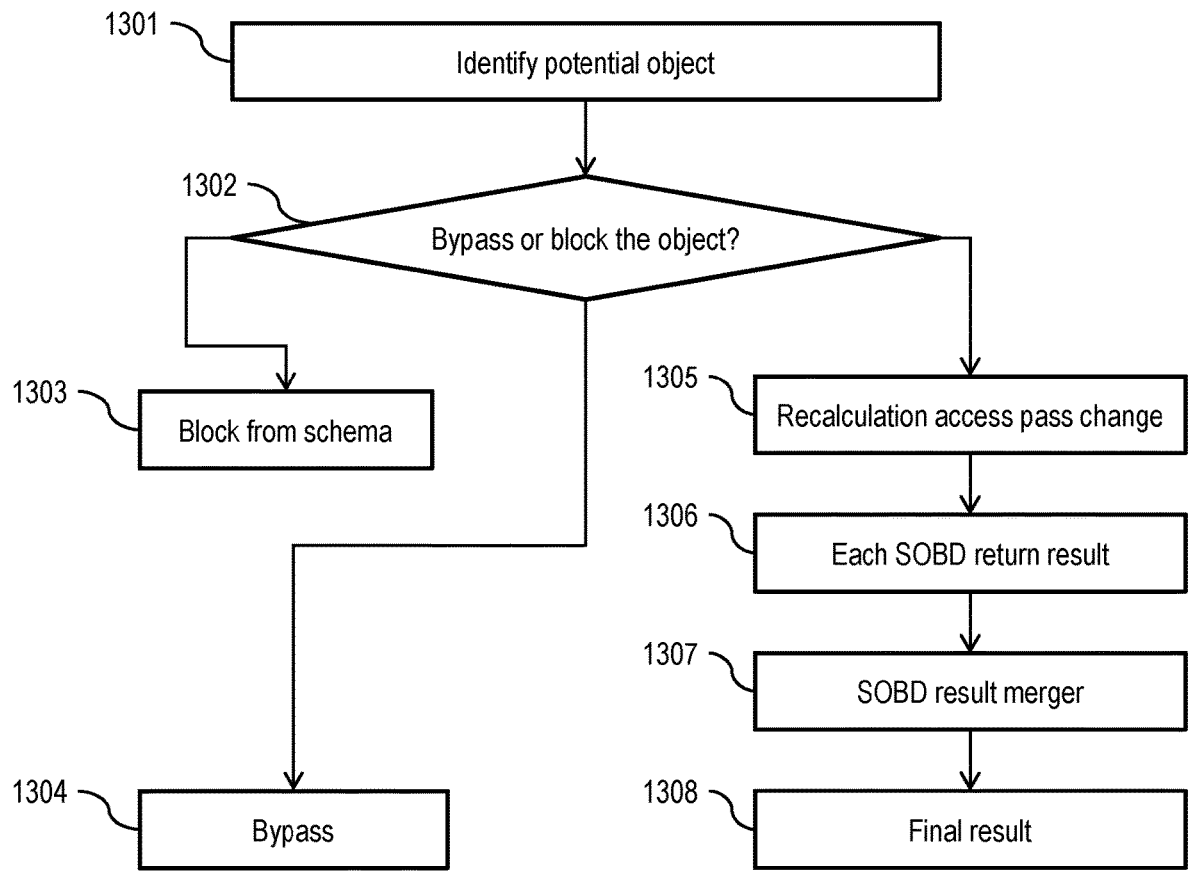
FIG. 13 shows a flowchart of an exemplary method in accordance with aspects of the invention.

FIG. 13 shows a flowchart of an exemplary method in accordance with aspects of the present invention. Steps of the method may be carried out in the environment of FIG. 4 and are described with reference to elements depicted in FIG. 4. The method of FIG. 13 is an example of a use case with a result set limitation action. In embodiments, the database server 415 identifies a potential object at step 1301 (e.g., by using the security policy or rule to determine which object (table, column, or partition) is involved in the security check) and checks whether to bypass or block the object at step 1302 (e.g., based on comparing the policy to the determined object). Based on the check at step 1302, the database server 415 performs one of: blocks the result set at step 1303 (e.g., by terminating the connection from the database server), bypasses the security rule at step 1304 (e.g., gets the full result set from the database server), or applies a reinforced security policy at steps 1305-1308. In embodiments, the database server 415 recalculates an access pass change at step 1305 (e.g., by calculating a cost based on the specific security object(s) and then choosing a new access path), obtains a return result from each SOBD at step 1306 (e.g., get the result return with the new access path from each SOBD), merges the SOBD results at step 1307 (e.g., merges the results from step 1306), and delivers a final result at step 1308 (e.g., returns the result to the user).

Figure 14:
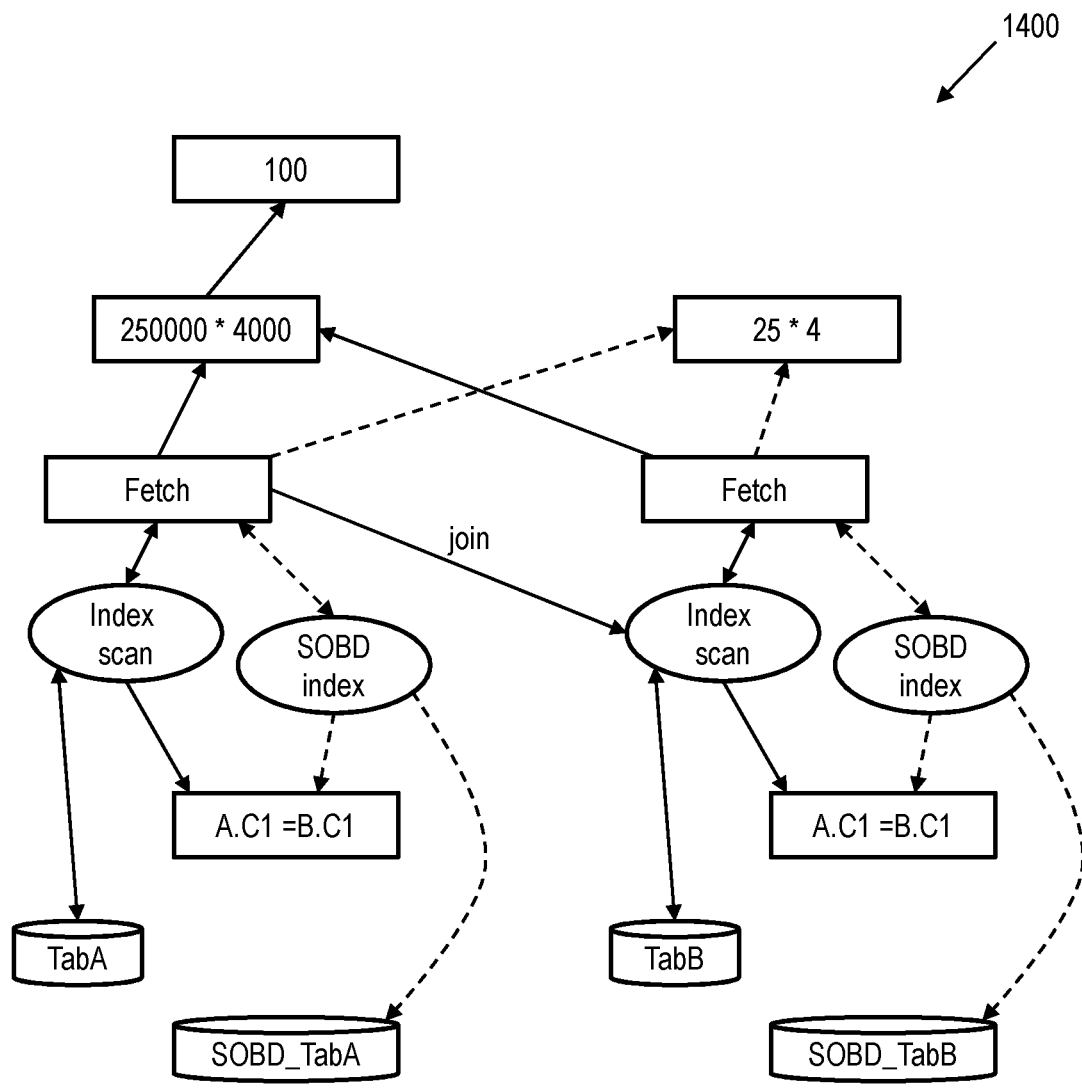
FIG. 14 shows a block diagram of an exemplary use case of FIG. 13 in accordance with aspects of the invention.

FIG. 14 shows a block diagram 1400 of the exemplary use case of FIG. 13 in accordance with aspects of the invention. In the block diagram 1440, the solid lines correspond to database processing that occurs with step 1304 of FIG. 13, which produces a relatively large result set (e.g., 250,000*4000=1,000,000,000) that is then paired down to the final result size (e.g., 100), which utilizes a relatively large amount of computing resources. In the block diagram 1440, the dashed lines correspond to database processing that occurs with steps 1305-1308 of FIG. 13, which results in a relatively small result set (e.g., 100), which utilizes a relatively small amount of computing resources.

Embodiments may be implemented using a cloud-based federation model. In these embodiments, for different database nodes, the system trains a federation model to learn a distillation model from other database nodes that have similar business requirements, database traffic, or security requirements. In these embodiments, a method includes: determining aligned samples and features; using interaction to calculate an intermediate result of a gradient on different database nodes; calculating until getting convergence of loss; and each node refreshing model parameters.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    obtaining, by a database server, security policies associated with a database hosted by the database server;
    obtaining, by the database server, first database data associated with the database, wherein the first database data comprises database security object definitions of the database;

creating, by the database server, a knowledge distillation model using the security policies and the first database data;

obtaining, by the database server, second database data associated with the database, wherein the second database data comprises business requirements data;

creating, by the database server, a classification model using the second database data and an output of the knowledge distillation model;

receiving, by the database server, a client database request to the database;

determining, by the database server, a new security policy rule set using the classification model; and applying, by the database server, the new security policy rule set to the client database request.

2. The method of claim 1, wherein the creating the knowledge distillation model comprises:
determining affected factors from the security policies; and
analyzing groupings of the affected factors.

3. The method of claim 1, wherein the first database data comprises database statistics and operating system statistics.

4. The method of claim 3, wherein the database security object definitions comprise plural different database security object definitions at plural different levels of the database.

5. The method of claim 1, wherein the second database data comprises operating system statistics.

6. The method of claim 1, wherein the classification model:
receives parameters associated with the client database request as an input; and
generates the new security policy rule set as an output based on the input.

7. The method of claim 1, wherein:
the database is one of plural different database nodes; and
the creating the knowledge distillation model comprises training a federation model using data from the plural different database nodes.

8. A computer program product comprising one or more computer readable storage media having program instructions collectively stored on the one or more computer readable storage media, the program instructions executable to:
obtain security policies associated with a database hosted by a database server;
obtain first database data associated with the database;
create a knowledge distillation model using the security policies and the first database data using a feed forward network to train a neural network;
obtain second database data associated with the database;
create a classification model using the second database data and an output of the knowledge distillation model using logistic regression;
receive a client database request to the database;
determine a new security policy rule set using the classification model; and
apply the new security policy rule set to the client database request.

9. The computer program product of claim 8, wherein the creating the knowledge distillation model comprises:
determining affected factors from the security policies; and
analyzing groupings of the affected factors.

10. The computer program product of claim 8, wherein the first database data comprises database statistics, operating system statistics, and database security object definitions.

11. The computer program product of claim 10, wherein the database security object definitions comprise plural different database security object definitions at plural different levels of the database.

12. The computer program product of claim 8, wherein the second database data comprises operating system statistics and business requirements data.

13. The computer program product of claim 8, wherein the classification model:
receives parameters associated with the client database request as an input; and
generates the new security policy rule set as an output based on the input.

14. The computer program product of claim 8, wherein:
the database is one of plural different database nodes; and
the creating the knowledge distillation model comprises training a federation model using data from the plural different database nodes.

15. A system comprising:
a processor, a computer readable memory, one or more computer readable storage media, and program instructions collectively stored on the one or more computer readable storage media, the program instructions executable to:
obtain security policies associated with a database hosted by a database server;
obtain first database data associated with the database;
create a knowledge distillation model using the security policies and the first database data using a feed forward network to train a neural network;
obtain second database data associated with the database;
create a classification model using the second database data and an output of the knowledge distillation model using logistic regression;
receive a client database request to the database;
determine a new security policy rule set using the classification model; and
apply the new security policy rule set to the client database request.

16. The system of claim 15, wherein the creating the knowledge distillation model comprises:
determining affected factors from the security policies; and
analyzing groupings of the affected factors.

17. The system of claim 15, wherein:
the first database data comprises database statistics, operating system statistics, and database security object definitions; and
the database security object definitions comprise plural different database security object definitions at plural different levels of the database.

18. The system of claim 15, wherein the second database data comprises operating system statistics and business requirements data.

19. The system of claim 15, wherein the classification model:
receives parameters associated with the client database request as an input; and
generates the new security policy rule set as an output based on the input.

20. The system of claim 15, wherein:
the database is one of plural different database nodes; and
the creating the knowledge distillation model comprises training a federation model using data from the plural different database nodes.

* * * * *